US008958995B2

(12) United States Patent
Kar et al.

(10) Patent No.: US 8,958,995 B2
(45) Date of Patent: Feb. 17, 2015

(54) SYSTEM AND METHOD FOR MONITORING ROTATING AND RECIPROCATING MACHINERY

(75) Inventors: Chinmaya Kar, Karnataka (IN); Meenakshi Sunderam, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 493 days.

(21) Appl. No.: 13/401,769

(22) Filed: Feb. 21, 2012

(65) Prior Publication Data
US 2013/0218484 A1 Aug. 22, 2013

(51) Int. Cl.
*G06F 19/00* (2011.01)
(52) U.S. Cl.
USPC .......................................................... 702/36
(58) Field of Classification Search
CPC ......... F02G 1/043; Y02T 10/146; B01D 1/28; B01D 5/006; C02F 1/048
USPC .................................... 702/36, 130, 182–185
See application file for complete search history.

(56) References Cited

U.S. PATENT DOCUMENTS

| | | | |
|---|---|---|---|
| 4,060,716 A | 11/1977 | Pekrul et al. | |
| 4,237,454 A | 12/1980 | Meyer | |
| 4,267,734 A | 5/1981 | Shima et al. | |
| 4,286,515 A | 9/1981 | Baumann et al. | |
| 4,621,177 A | 11/1986 | Pulkowski et al. | |
| 4,675,487 A | 6/1987 | Verkasalo | |
| 4,704,191 A | 11/1987 | Wedel | |
| 4,758,964 A | 7/1988 | Bittner et al. | |
| 4,862,749 A | 9/1989 | Yagi | |
| 4,885,707 A | 12/1989 | Nichol et al. | |
| 4,931,949 A | 6/1990 | Hernandez et al. | |
| 5,149,936 A | 9/1992 | Walton, II | |
| 5,262,958 A | 11/1993 | Chui et al. | |
| 5,381,697 A | 1/1995 | van der Pol | |
| 5,479,824 A | 1/1996 | Torres | |

(Continued)

FOREIGN PATENT DOCUMENTS

| | | | |
|---|---|---|---|
| EP | 1 528 377 A2 | 5/2005 | |
| EP | 1 097 363 B1 | 12/2007 | |

(Continued)

OTHER PUBLICATIONS

European Search Report dated Jun. 5, 2013 in connection with European Patent Application No. EP 13 15 2605.

(Continued)

*Primary Examiner* — Edward Raymond

(57) ABSTRACT

A system includes multiple sensors configured to measure one or more characteristics of a rotating o reciprocating systems. The system also includes a monitoring system configured to monitor a health of the rotating system. The monitoring system includes an input interface configured to receive multiple input signals from the sensors. The monitoring system also includes a processing unit configured to identify a fault in the rotating system using the input signals. The monitoring system further includes an output interface configured to provide an indicator identifying the fault. The processing unit is configured to identify the fault by (i) generating a pressure-volume diagram from a fusion of the input signals and comparing the pressure-volume diagram to a previous diagram to determine changes in the diagrams and/or (ii) normalizing the input signals and using the normalized input signals to identify a defect and calculate a confidence level of the defect.

20 Claims, 9 Drawing Sheets

(56) References Cited

U.S. PATENT DOCUMENTS

| | | |
|---|---|---|
| 5,501,105 A | 3/1996 | Hernandez et al. |
| 5,511,422 A | 4/1996 | Hernandez |
| 5,519,337 A | 5/1996 | Casada |
| 5,533,400 A | 7/1996 | Gasch et al. |
| 5,594,180 A | 1/1997 | Carpenter et al. |
| 5,616,824 A | 4/1997 | Abdel-Malek et al. |
| 5,641,891 A | 6/1997 | Frankl et al. |
| 5,646,600 A | 7/1997 | Abdel-Malek et al. |
| 5,750,879 A | 5/1998 | Ohtsuka et al. |
| 5,875,420 A | 2/1999 | Piety et al. |
| 5,939,625 A | 8/1999 | Torii et al. |
| 5,943,634 A | 8/1999 | Piety et al. |
| 5,966,674 A | 10/1999 | Crawford et al. |
| 6,053,047 A | 4/2000 | Dister et al. |
| 6,208,943 B1 | 3/2001 | Randolph et al. |
| 6,225,892 B1 | 5/2001 | Chene |
| 6,298,308 B1 | 10/2001 | Reid et al. |
| 6,330,525 B1 | 12/2001 | Hays et al. |
| 6,349,637 B1 | 2/2002 | Molteni |
| 6,370,957 B1 | 4/2002 | Filippenko et al. |
| 6,408,676 B1 | 6/2002 | Stratton et al. |
| 6,484,109 B1 | 11/2002 | Lofall |
| 6,505,517 B1 | 1/2003 | Eryurek et al. |
| 6,507,789 B1 | 1/2003 | Reddy et al. |
| 6,526,356 B1 | 2/2003 | DiMaggio et al. |
| 6,526,831 B2 | 3/2003 | Ben-Romdhane |
| 6,539,315 B1 | 3/2003 | Adams et al. |
| 6,567,709 B1 | 5/2003 | Malm et al. |
| 6,654,697 B1 | 11/2003 | Eryurek et al. |
| 6,657,529 B1 | 12/2003 | Albach |
| 6,681,634 B2 | 1/2004 | Sabini et al. |
| 6,694,285 B1 | 2/2004 | Choe et al. |
| 6,725,167 B2 | 4/2004 | Grumstrup et al. |
| 6,727,725 B2 | 4/2004 | Devaney et al. |
| 6,757,668 B1 | 6/2004 | Goebel et al. |
| 6,789,422 B1 | 9/2004 | Ward, Jr. |
| 6,802,221 B2 | 10/2004 | Hedeen et al. |
| 6,845,340 B2 | 1/2005 | Edie et al. |
| 6,900,420 B2 | 5/2005 | Markegard et al. |
| 6,901,335 B2 | 5/2005 | Wang et al. |
| 6,925,879 B2 | 8/2005 | Raichle |
| 6,933,693 B2 | 8/2005 | Schuchmann |
| 6,941,785 B2 | 9/2005 | Haynes et al. |
| 7,027,953 B2 | 4/2006 | Klein |
| 7,099,782 B2 | 8/2006 | Hitchcock et al. |
| 7,257,501 B2 | 8/2007 | Zhan et al. |
| 7,274,995 B2 | 9/2007 | Zhan et al. |
| 7,286,945 B2 | 10/2007 | Zhan et al. |
| 7,289,919 B2 | 10/2007 | Boerhout |
| 7,421,374 B2 | 9/2008 | Zhan et al. |
| 7,640,802 B2 | 1/2010 | King et al. |
| 7,822,580 B2 | 10/2010 | Mustonen |
| 7,912,659 B2 | 3/2011 | Luo |
| 7,945,397 B2 | 5/2011 | Kar |
| 7,970,556 B2 | 6/2011 | Hala et al. |
| 2002/0020144 A1 | 2/2002 | Sarles et al. |
| 2002/0169569 A1 | 11/2002 | Miller |
| 2003/0019297 A1 | 1/2003 | Fiebelkorn et al. |
| 2003/0216888 A1 | 11/2003 | Ridolfo |
| 2004/0024568 A1 | 2/2004 | Eryurek et al. |
| 2004/0049357 A1 | 3/2004 | Delvaux et al. |
| 2004/0159112 A1 | 8/2004 | Jayanth et al. |
| 2005/0096873 A1 | 5/2005 | Klein |
| 2005/0104020 A1 | 5/2005 | Zhan et al. |
| 2006/0025970 A1 | 2/2006 | Wegerich |
| 2006/0071666 A1 | 4/2006 | Unsworth et al. |
| 2007/0088534 A1 | 4/2007 | MacArthur et al. |
| 2010/0030492 A1 | 2/2010 | Kar et al. |
| 2010/0106458 A1* | 4/2010 | Leu et al. .................. 702/181 |
| 2010/0145639 A1 | 6/2010 | Fu et al. |
| 2010/0256932 A1 | 10/2010 | Kar |
| 2011/0135415 A1 | 6/2011 | Hamaguchi et al. |
| 2011/0156921 A1 | 6/2011 | Kyllingstad |
| 2011/0213571 A1 | 9/2011 | Sihler et al. |
| 2011/0290024 A1 | 12/2011 | Lefler |
| 2011/0307218 A1 | 12/2011 | Kar et al. |
| 2013/0049733 A1 | 2/2013 | Neti et al. |
| 2013/0207810 A1 | 8/2013 | Kar et al. |

FOREIGN PATENT DOCUMENTS

| | | |
|---|---|---|
| JP | 62226033 A | 10/1987 |
| JP | 07-43278 B2 | 5/1995 |
| JP | 2005147081 A | 6/2005 |
| KR | 20030048779 A | 6/2003 |
| KR | 20050011919 A | 1/2005 |
| WO | WO 03/090091 A1 | 10/2003 |

OTHER PUBLICATIONS

Laibin Zhang, et al., "Short-term fault prediction of mechanical rotating parts on the basis of fuzzy-grey optimising method", Mechanical Systems and Signal Processing 21 (2007), p. 856-865.

Michael J. Devaney, et al., "Detecting Motor Bearing Faults", IEEE Instrumentation & Measurements Magazine, Dec. 2004, p. 30-35 & 50.

Jason R. Stack, et al., "Fault Classification and Fault Signature Production for Rolling Element Bearings in Electric Machines", IEEE Transactions on Industry Applications, vol. 40, No. 3 May/Jun. 2004, p. 735-739.

Peter W. Tse, et al., "Wavelet Analysis and Envelope Detection for Rolling Element Bearing Fault Diagnosis—Their Effectiveness and Flexibilities", Journal of Vibration and Acoustics, Jul. 2001, vol. 123, p. 303-310.

V. Sugumaran, et al., "Automatic rule learning using decision tree for fuzzy classifier in fault diagnosis of roller bearing", Mechanical Systems and Signal Processing 21 (2007), p. 2237-2247.

Yaguo Lei, et al., "Fault diagnosis of rotating machinery based on multiple ANFIS combination with GA s", Mechanical Systems and Signal Processing 21 (2007), p. 2280-2294.

Jason R. Stack, et al., "An Amplitude Modulation Detector for Fault Diagnosis in Rolling Element Bearings", IEEE Transactions on Industrial Electronics, vol. 51, No. 5, Oct. 2004, p. 1097-1102.

Robert B. Randall, "State of the Art in Monitoring Rotating Machinery—Part 1", Sound and Vibration, Mar. 2004, p. 14-20.

Z.K. Peng, et al., "A comparison study of improved Hilbert-Huang transform and wavelet transform: Application to Fault disgnosis for rolling bearing", Mechanical Systems and Signal Processing 19 (2005), p. 974-988.

Xinsheng Lou, et al., "Bearing fault diagnosis based on wavelet transform and fuzzy inference", Mechanical Systems and Signal Processing 18 (2004) p. 1077-1095.

T.I. Liu, et al., "Detection of Roller Bearing Defects Using Expert System and Fuzzy Logic", Mechanical Systems and Signal Processing (1996) 10(5), p. 595-614.

Yaguo Lei, et al., "A new approach to intelligent fault diagnosis of rotating machinery", Expert Systems with Applictaions 35 (2008), p. 1593-1600.

Paula J. Dempsey, et al., "Tapered Roller Bearing Damage Detection Using Decision Fusion Analysis", NASA/TM-2006-21430, Jul. 2006, 23 pages.

A.R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.

Chinmaya Kar, et al., "Vibration and current transient monitoring for gearbox fault detection using multiresolution Fourier transform", Journal of Sound and Vibration 311 (2008), p. 109-132.

Chinmaya Kar, et al., "Monitoring gear vibrations through motor current signature analysis and wavelet transform", Mechanical Systems and Signal Processing 20 (2006), p. 158-187.

T. Lindth et al., "Automatic bearing fault classification combining statistical classification and fuzzy logic", 4th Nordic Workshop in Power & Industrial Electronics, Jun. 2004, 5 pages.

Carl S. Byington, P.E., et al., "In-Line Health Monitoring System for Hydraulic Pumps and Motors", 2003 IEEE, 9 pages.

Kai F. Goebel, "Conflict Resolution Using Strengthening and Weakening Operations in Decision Fusion", Proceedings of the 4th Annual Conference on Information Fusion, Fusion 2001, pp. ThA1-19-ThA1-25, 2001.

(56) References Cited

OTHER PUBLICATIONS

Sanket Amin, et al., "Fuzzy Inference and Fusion for Health State Diagnosis of Hydraulic Pumps and Motors", AFDDPS-NAFIPS, Jun. 2005, 6 pages.
B.P. Lathi, "Linear Systems and Signals", 1992, Berkeley-Cambridge Press, p. 574-580.
Chinmaya Kar, et al., "Severity Analysis Apparatus and Method for Shafts of Rotating Machinery", U.S. Appl. No. 13/166,205, filed Jun. 22, 2011.
Chinmaya Kar, "Rule-Based Diagnostics Apparatus and Method for Rotating Machinery", U.S. Appl. No. 13/166,524, filed Jun. 22, 2011.
International Search Report dated Dec. 9, 2010 in connection with International Patnt Application No. PCT/US2010/028258.
Written Opinion of the International Searching Authority dated Dec. 9, 2010 in connection with International Patnt Application No. PCT/US2010/028258.
"Efficient Vibration Condition Assessment, Methodology Overview", DLI Engineering Corporation, 2002, 2 pages.
"Alert Process Data Logger, Machine Performance Monitoring for Machine Condition Analysis", DLI Engineering Corporation, 2008, 2 pages.
Alan Friedman, "Automated Bearing Wear Detection", Published in Vibration Institute Proceedings 2004, 10 pages.
"SprintMAX, Online Monitoring & Diagnostic System", DLI Engineering Corporation, 2005, 8 pages.
"DLI Watchman PR-1/PR-2, Vibration Precision Reference Calibrators", DLI Engineering Corporation, 2007, 2 pages.
Simon G. Braun, "The Signature Analysis of Sonic Bearing Vibrations", IEEE Transactions on Sonics and Ultrasonics, vol. SU-27, No. 6, Nov. 1980, pp. 317-327.
Y. Gao et al., "Wavelet-Based Pressure Analysis for Hydraulic Pump Health Diagnosis", Transactions of the ASAE, vol. 46(4), pp. 969-976, Jan. 2003.
Horch A, "A Simple Method for Detection of Stiction in Control Valves", Control Engineering Practice, Pergamon Press, Oxford, GB, vol. 7, 1999, pp. 1221-1231.
Jiang Wanlu et al., "Applying Multiresolution Analysis for Processing of Hydraulic Pump Fault Signal", Fifth International Conference on Fluid Power Transmission and Control, Hangzhou, China, Apr. 2001, pp. 1-5.
Fujun He et al. "WPT-SVMs Based Approach for Fault Detection of Valves in Reciprocating Pumps", Proceedings of the American Control Conference, Anchorage, AK, May 8-10, 2002, pp. 4566-4570.
Mallat et al., "Singularity Detection and Processing with Wavelets", Mar. 1992, IEEE Transactions on Information Theory, vol. 38, No. 2, pp. 617-643.
Wang et al., "The Fault Character of the Motors Identified Based on Wavelet Transform", Nov. 2-5, 2003, Proceedings of the Second International Conference on Machine Learning and Cybernetics, Xi'an, pp. 2394-2398.
Gao et al., "Support Vector Machines Based Apprroach for Fault Diagnosis of Valves in Reciprocating Pumps", 2002 IEEE Canadian Conference, pp. 1622-1627.
Ren et al., "Fault Feature Extracting by Wavelet Transform for Control System Fault Detection and Diagnosis", 2000 IEEE, International Conference on Control Applications, pp. 485-489.
International Search Report for PCT/US2004/038766, issued by the International Searching Authority, mailed Apr. 14, 2005, by the European Patent Office, P.B. 5818 Patentlaan 2, NL-2280 HV Rijswijk.
Parvez S. et al., "A Wavelet-Based Multi-Resolution PID Controller", 2003 IEEE Conference, Salt Lake City, UT, Oct. 2003, vol. 3 of 3, Conf. 38, pp. 1-5.
Zhihan Xu et al., "Design of-Fault Detection and Isolation Via Wavelet Analysis and Neural Network", 2002 IEEE International Symposium, Vancouver, Canada, Oct. 2002, pp. 467-472.
Song Zhihuan et al., "Adaptive Predictive Control Based on Wavelet Approximation Models", IEEE Conference, Beijing China, Oct. 1996, vol. 2, pp. 820-824.
Xiaohua Xia et al., "Nonlinear Adaptive Predictive Control Based on Orthogonal Wavelet Networks", Shanghai China, Jun. 2002, vol. 1, pp. 305-311.
Nounou M N et al., "Multiscale Fuzzy System Identification", Journal of Process Control, Oxford, GB, vol. 15, No. 7, Oct. 2005, pp. 763-770.
Billings S A et al., "Discrete Wavelet Models for Identification and Qualitative Analysis of Chaotic Systems", Singapore, SG, vol. 9, No. 7, Jul. 1999, pp. 1263-1284.
A. R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.
Chinmaya Kar, et al., "Vibration and current transient monitoring for gearbox fault detection using multiresolution Fourier transform", Journal of Sound and Vibration 311 (2008), p. 109-132.
Chinmaya Kar, et al., "Monitoring gear vibrations through motor current signature analysis and wavelet transform", Mechanical System and Signal Processing 20 (2006), p. 158-187.
Notification of Transmittal of the International Search Report and the Written Opinion of the International Searching Authority, or the Declaration dated Dec. 7, 2011 in connection with International Patent Application No. PCT/US2011/038856.
"The Technology of ExpertALERT, Intelligent Machine Condition Assessment Software", DLI Engineering Corporation, 2007, 4 pages.
Office Action dated Oct. 8, 2014 in connection with U.S. Appl. No. 13/166,205.

* cited by examiner

SYSTEM AND METHOD FOR MONITORING ROTATING AND RECIPROCATING MACHINERY

CROSS-REFERENCE TO RELATED APPLICATIONS

This application hereby claims priority under 35 U.S.C. §120 to the following U.S. patent applications:

- U.S. patent application Ser. No. 12/417,475 filed on Apr. 2, 2009 and entitled "SYSTEM AND METHOD FOR GEARBOX HEALTH MONITORING";
- U.S. patent application Ser. No. 12/417,452 filed on Apr. 2, 2009 and entitled "SYSTEM AND METHOD FOR DETERMINING HEALTH INDICATORS FOR IMPELLERS";
- U.S. patent application Ser. No. 12/503,783 filed on Jul. 15, 2009 and entitled "APPARATUS AND METHOD FOR IDENTIFYING HEALTH INDICATORS FOR ROLLING ELEMENT BEARINGS"; and
- U.S. patent application Ser. No. 13/166,205 filed on Jun. 22, 2011 and entitled "SEVERITY ANALYSIS APPARATUS AND METHOD FOR SHAFTS OF ROTATING MACHINERY."

These applications are hereby incorporated by reference in their entirety.

TECHNICAL FIELD

This disclosure relates generally to rotating devices. More specifically, this disclosure relates to a system and method for monitoring rotating machinery.

BACKGROUND

More than 80% of the rotating pieces of equipment in a typical refinery or power plant are centrifugal pumps. The number of centrifugal pumps can often be on the order of 1,000 pumps or more in such plants. Any failure in a pump can cause large-scale downtime of the plant, as well as high maintenance costs. Therefore, continuous monitoring of these pumps is useful so that the progress of any fault can be monitored. There are various components in a typical pump, such as its bearings, impeller, shaft, and gearbox.

One survey found that gearbox failures account for 340 of all failure modes (such as fatigue) in aircraft. Another survey revealed that gearbox failures account for 15% of all failures in a certain industry. Equipment failures typically result in lost revenues due to plant downtime. Accordingly, detecting potential failures (such as faults) in a gearbox or other equipment at an early stage can assist in preventing secondary damage, save maintenance costs, improve plant uptimes, reduce potential financial losses from plant downtime, and assist towards increasing productivity.

SUMMARY

This disclosure provides a system and method for monitoring rotating and reciprocating machinery.

In a first embodiment, an apparatus includes an input interface configured to receive multiple input signals, where each input signal is associated with a respective stage of at least one of: a rotating system and a reciprocating system. The apparatus also includes a processing unit configured to identify a fault in the rotating system using the input signals. The processing unit is configured to identify the fault by (i) generating a pressure-volume diagram from a fusion of the input signals and comparing the pressure-volume diagram to a previous diagram to determine changes in the diagrams and/or (ii) normalizing the input signals and using the normalized input signals to identify a defect and calculate a confidence level of the defect. The apparatus further includes an output interface configured to provide an indicator identifying the fault.

In a second embodiment, a system includes multiple sensors configured to measure one or more characteristics of at least one of: a rotating system and a reciprocating system. The system also includes a monitoring system configured to monitor a health of the rotating system. The monitoring system includes an input interface configured to receive multiple input signals from the sensors. The monitoring system also includes a processing unit configured to identify a fault in the rotating system using the input signals. The monitoring system further includes an output interface configured to provide an indicator identifying the fault. The processing unit is configured to identify the fault by (i) generating a pressure-volume diagram from a fusion of the input signals and comparing the pressure-volume diagram to a previous diagram to determine changes in the diagrams and/or (ii) normalizing the input signals and using the normalized input signals to identify a defect and calculate a confidence level of the defect.

In a third embodiment, a method includes receiving multiple input signals, where each input signal is associated with a respective stage of at least one of: a rotating system and a reciprocating system. The method also includes identifying a fault in the rotating system using the input signals. The fault is identified by (i) generating a pressure-volume diagram from a fusion of the input signals and comparing the pressure-volume diagram to a previous diagram to determine changes in the diagrams and/or (ii) normalizing the input signals and using the normalized input signals to identify a defect and calculate a confidence level of the defect. In addition, the method includes providing an indicator identifying the fault.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
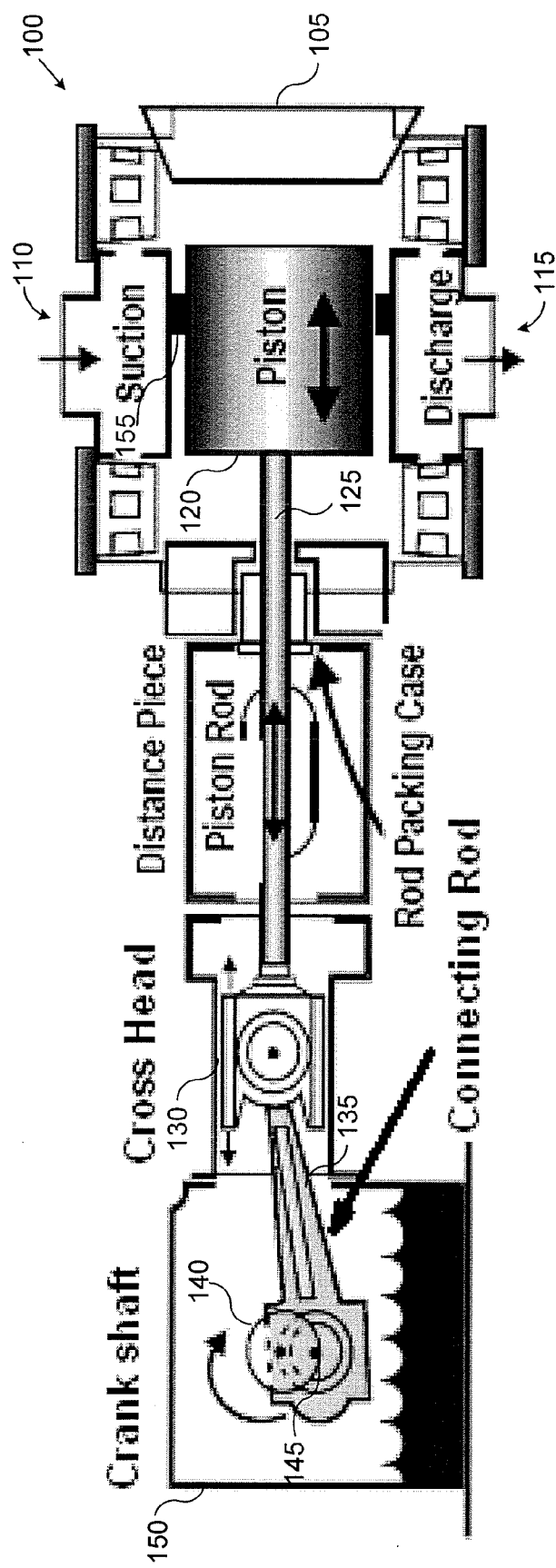
FIG. 1 illustrates an example reciprocating compressor according to this disclosure.

FIG. 1 illustrates an example reciprocating compressor 100 according to this disclosure. As shown in FIG. 1, the reciprocating compressor 100 includes a number of components, such as a cylinder 105, suction and discharge valves 110-115, a piston 120 with rider bands, a piston rod 125, a cross head 130, a crank rod 135, a crank shaft 140, bearings 145 at the crank shaft 140, and a frame 150. A driver for the compressor 100 could represent an induction motor and include components such as a stator, rotor, and bearings. Note that although a reciprocating compressor 100 is shown here, other types of rotating machinery could be monitored as described below. For example, the rotating machinery can include gearboxes, impellers, and pumps.

Each of the components in rotating or reciprocating machinery can suffer from one or more failure modes. For example, in a rotating machine, a fault or failure may occur in a gearbox, which can be formed using any one or more of a number of different gear types. A gearbox failure could occur in a gear, a pinion, or multiple components. As particular examples, gearbox failures can include wear, cracking, tooth breakage, static and dynamic transmission error, plastic flow, scoring, scuffing, surface fatigue, spalling, and backlash. Example failure modes of an impeller can include vane breakage, one or more cracks in the impeller, and wear in the impeller. In compressor valves, prominent failure modes involve pressure packing, piston rings, and process problems.

Rotating machinery, such as gearboxes, can include multiple configurations. These configurations can include:
1. Different bearing numbers or bearing geometries, like pitch circle diameter, ball diameter, number of balls, and contact angle at each measurement points;
2. Different numbers of stages of gears, and different numbers of teeth in the gears and pinions at each stage; and
3. Different numbers of stages of impellers, and different numbers of vanes at each stage and the like.

Figure 2:
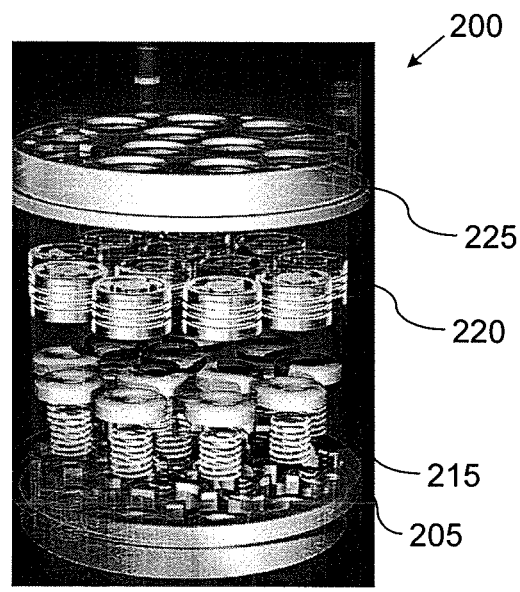
FIG. 2 illustrates an example construction of a valve according to this disclosure.
Figure 3:
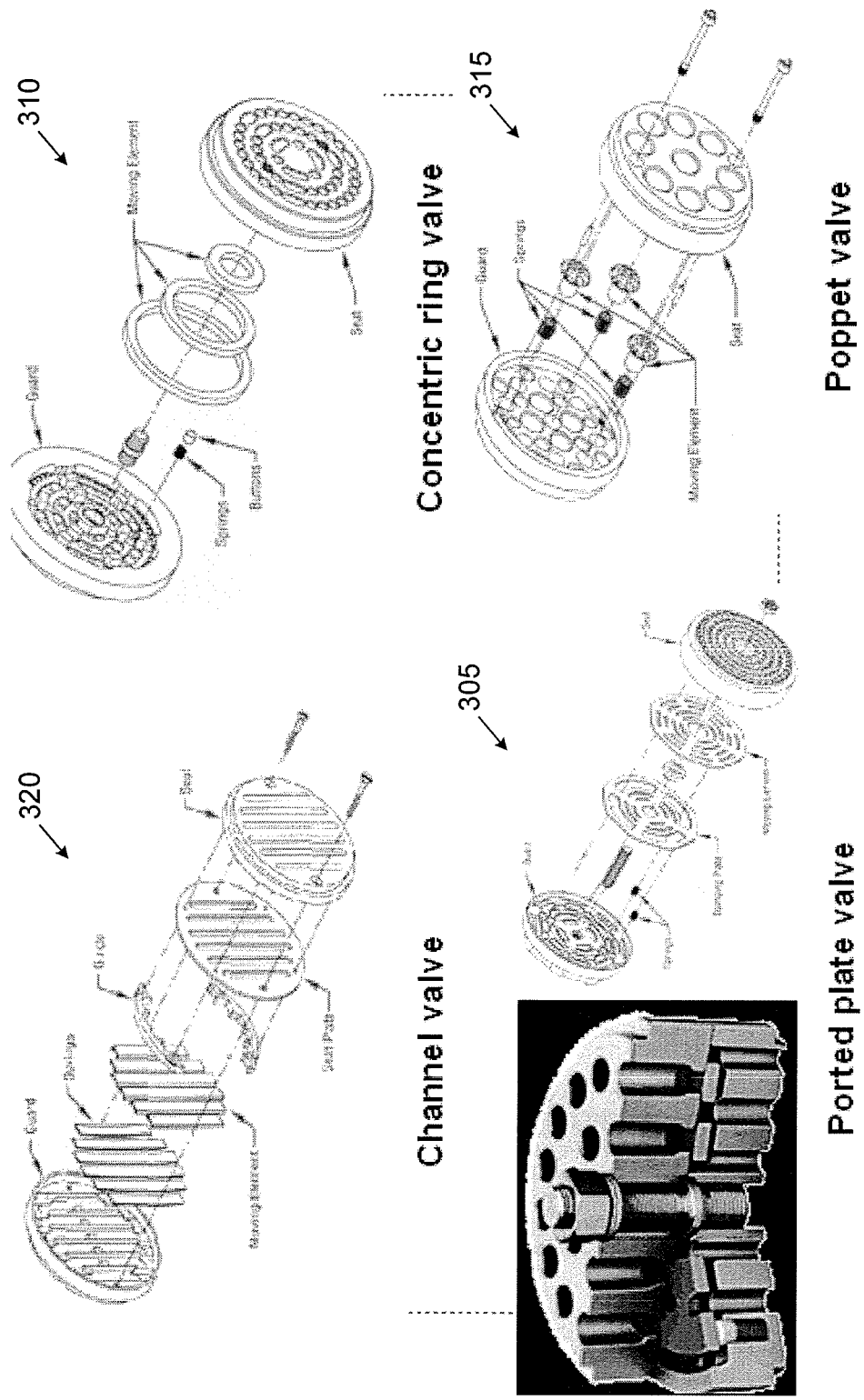
FIG. 3 illustrates different example types of valves according to this disclosure.

FIG. 2 illustrates an example construction of a valve 200 according to this disclosure, and FIG. 3 illustrates different example types of valves according to this disclosure. The valves in a reciprocating compressor 100 may include differential pressure valves 200, each of which can include a seat 205, a guard or stop plate 210, springs 215, spring buttons or knobs 220, and moving or sealing elements 225. These valves 200 are further classified depending on the type of moving elements in the valves. For instances, the moving elements could include different components in a ported plate valve 305, a concentric ring valve 310, a poppet valve 315, and a channel valve 320. Again, there are various failure modes in each type of valve, including seat wear, seat overstress, fatigue of moving elements, fatigue of springs, and corrosion.

In real practice, it is often difficult to isolate these faults using vibration data only. In accordance with this disclosure, however, systems and methods are disclosed that can isolate these problems by combining information from dynamic pressure sensors and temperature measurements involving valves, cylinder heads, and pressure packing.

Consider, for example, the failure modes for pressure packing. A pressure packing can wear out due to sliding motion of the piston rod 125. Failures of the pressure packing may also occur as secondary damage due to wear of the rider band in the piston 120 or wear of the cross head 130. When packing failure occurs, oscillations of the piston rod 135 have harmful effects on the cross head 130 and rider band of the piston 120. Moreover, leakage of gas can occur from the rod end of the cylinder 105.

With respect to failure modes of pressure rings, the pressure rings 155 form the contacting surface of the piston 120 with the cylinder 105. The pressure rings 155 can fail due to large wear and tear, as well as thermal expansion and contraction. Their failure can cause leakage of gas to the cylinder 105 for a single acting compressor. For a double acting compressor, the leakage happens from a low pressure side to a high pressure side at any instant, which gives rise to pressure changes and temperature variations of the cylinder 105.

Failure modes resulting from process issues may be due to inter-stage coolers when a pressure loss takes place. There can also be a problem if a cooling effect is not proper, which increases inlet temperature of a following stage and therefore increase a discharge temperature of that stage. This problem has a cascading effect over multiple inter-stage coolers and stages.

The cross head 130 connects the piston rod 125 and the connecting rod 135. Failure modes of the cross head 130 can occur due to wear and tear of babbit material in the cross head 130, pin failure, and the like. The effect of a cross head failure is often a large vibration of the piston rod 125 and the connecting rod 135. The pressure packing may also become damaged at a later stage.

In accordance with this disclosure, various systems and methods are provided to detect failure modes such as valve failures, pressure packing failures, pressure ring failures, and process issues. Certain embodiments can detect these failure modes using pressure/volume (PV) diagram monitoring, temperature monitoring at different points, and distributed control system (DCS) data monitoring.

Figure 4:
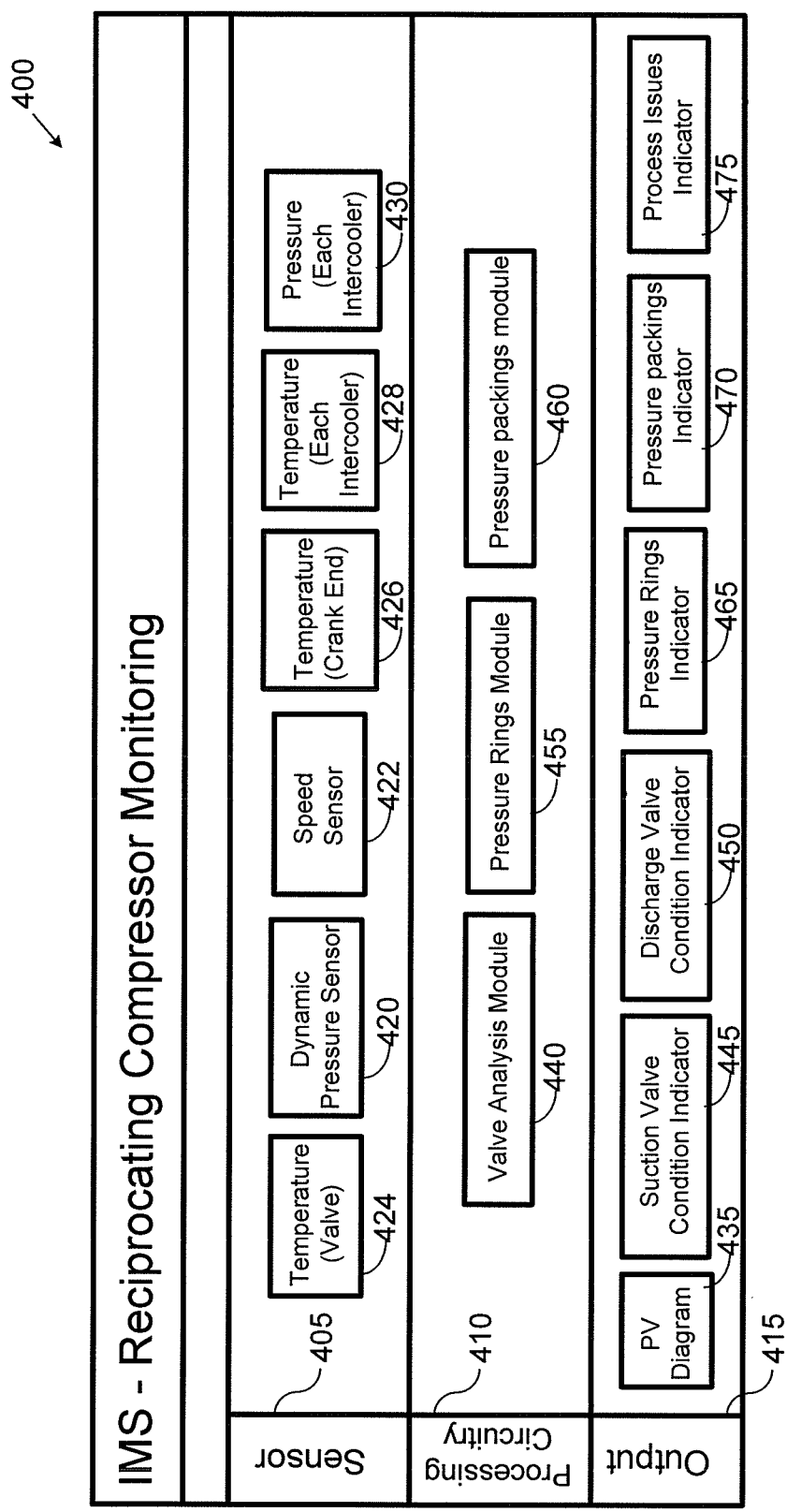
FIG. 4 illustrates an example Integrated Monitoring System (IMS) according to this disclosure.

FIG. 4 illustrates an example Integrated Monitoring System (IMS) 400 according to this disclosure. The IMS 400 is configured to be coupled to or otherwise operate in conjunction with a rotating machine system, such as a reciprocating compressor. The IMS 400 includes one or more sensors 405, processing circuitry 410, and an output 415.

The sensors 405 can include one or more dynamic pressure sensors 420, speed sensors 422, temperature sensors 424-428, and pressures sensors 430. In particular embodiments, the dynamic pressure sensor 420 can measure the pressure inside a cylinder 105. Other types of sensors could also be used, such as when a stroboscope or key phasor sensor can be used with a shaft to identify its stroke. A dynamic pressure sensor can perform high frequency sampling in order to obtain measurements at a small time resolution. Other techniques for monitoring valves could also be used, such as ultrasonic monitoring. Note that an ultrasonic sensor often detects problems at very high frequency, such as at 0.5-1 MHz, so appropriate hardware can be used to handle such high frequency signals. In particular embodiments, the IMS 400 can process data sampled at a 12.8 kHz frequency.

In this example, the temperature sensor 424 measures a temperature at a valve cover. The temperature sensor 426 measures a temperature at the crank end of the crank rod, and the temperature sensor 428 measures a temperature at each inter-stage cooler. The valve temperature measurements can indicate a temperature increase near the valve that helps to isolate any valve failure from other types of failure. These parameters facilitate drawing a PV diagram 435 and produce an effective monitoring solution for the valve.

A Valve Analysis Module (VAM) 440 receives signals from the sensors 405 and generates the PV diagram 435, a suction valve condition indicator 445, and a discharge valve condition indicator 450. The VAM 440 can compare the PV diagram 435 to one or more prior PV diagrams to identify changes occurring through time.

Figure 5:
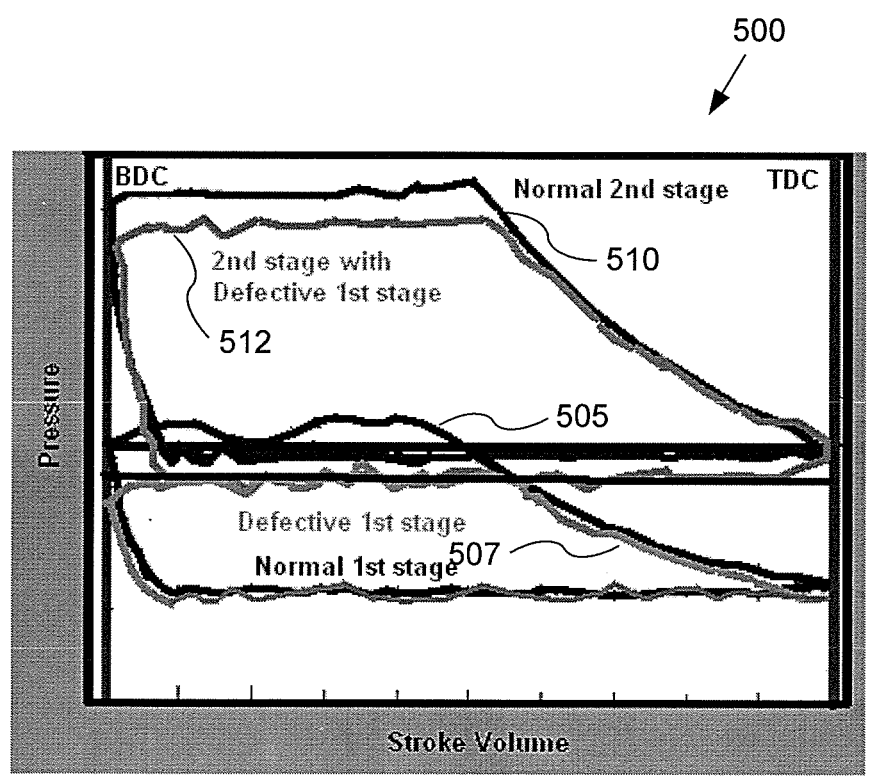
FIG. 5 illustrates an example pressure/volume (PV) diagram for a two-stage single acting reciprocating compressor according to this disclosure.

FIG. 5 illustrates an example PV diagram 500 for a two-stage single acting reciprocating compressor according to this disclosure. The PV diagram 500 here includes a first stage PV diagram for normal operation 505 and a second stage PV diagram for normal operation 510. Any damage in a suction or discharge valve of a first stage can affect the discharge pressure of the first stage. That is, the pressure versus volume shifts from a normal operation 505 to defective 507. The mean pressure of an inter-stage cooler therefore decreases in the process. Subsequently, a cascade effect occurs in the second stage in which its discharge pressure also drops. That is, the pressure versus volume shifts from a normal operation 510 to defective 512. The processing circuitry 410 receives measured pressures as inputs and decides if a problem exists in any stage. The processing circuitry 410 also performs fault isolation by supporting the fusion of the temperature information.

Returning to FIG. 4, assume that the PV diagram 435 shows pressure leakage in the cylinder 105. The leakage can occur as a result of a number of conditions, such as valve failure, pressure packing damage, or piston ring failure. In order to isolate the correct failure, temperature monitoring is performed, such as when resistance temperature detector (RTD) or other temperature sensors are placed near each valve 110-115, the pressure packing, and the cylinder 105. The exact reason of a leakage can then be verified using the temperature measurements. Moreover, the temperature at an inter-stage cooler can further help to determine whether a temperature increase at each component is due to process issues, such as ineffective cooling.

As a particular example, a reduction in the discharge pressure for a first stage of a two-stage reciprocating compressor may be due to suction valve damage, discharge valve damage, piston ring damage, or pressure packing damage (valid for a double acting reciprocating compressor). If the temperature is monitored at appropriate locations, exact fault isolation can be done. For pressure rings, the cylinder temperature can be monitored. In some embodiments, the temperature at a suction valve cap can become very high if there is a suction valve failure. The temperatures at other locations may increase gradually at lesser rates.

The processing circuitry 410 also includes a Pressure Rings Module (PRM) 455 and a Pressure Packings Module (PPM) 460. The PRM 455 receives signals from the sensors 405 and generates a pressure rings indicator 465. The PPM 460 receives signals from the sensors 405 and generates a pressure packings indicator 470. Further, the modules 440, 455 and 460 in the processing circuitry 410 can collectively generate a process issues indicator 475.

As noted above, the processing circuitry 410 can be configured to perform sensor fusion functions. For example, the processing circuitry 410 can use the sensor fusion process to fuse all sensor information from various sources. Once the sensor information is fused, the processing circuitry 410 can make a decision regarding the isolation of any potential defects. The fusion technique can involve any of the following techniques:
 1. Fuzzy fusion;
 2. Dempster-Shafer fusion; and
 3. Bayesian fusion.

Figure 6:
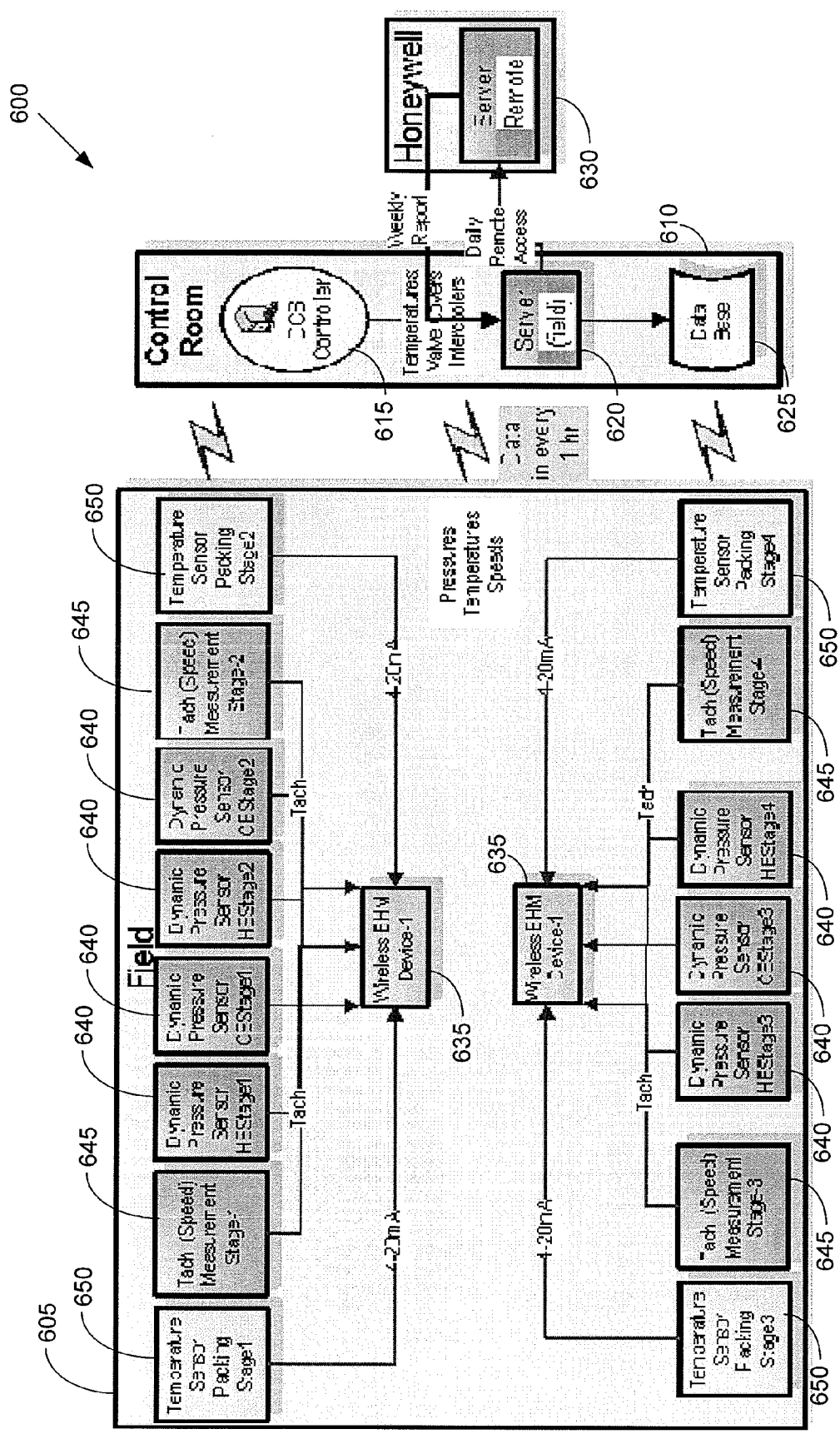
FIG. 6 illustrates an example monitoring system implementing the IMS of FIG. 4 according to this disclosure.

FIG. 6 illustrates an example monitoring system 600 implementing the IMS of FIG. 4 according to this disclosure. As shown in FIG. 6, the monitoring system 600 includes a field monitoring device 605 coupled (via wired or wireless communications) to a control room 610. The control room 610 includes a DCS controller 615, a field server 620, and a database 625. In some embodiments, the control room 610 further is coupled to a remote server 630.

The field device 605 includes at least one equipment health monitoring (EHM) unit 635, each of which is configured to interface with a plurality of dynamic pressure sensors 640, tachometers (speed sensors) 645, and temperature sensors 650. For example, the EHM unit 635 can be capable of communicating over a ONEWIRELESS wireless network from HONEYWELL INTERNATIONAL INC. and can be coupled to seven dynamic pressure sensors 640, tachometers 645 for four stages, and four temperature sensors 650. Additional temperature sensors in a compressor (if any) can be wired to the DCS controller 615. Each EHM unit 635 can communicate over any suitable wireless network at any suitable interval, such as by communicating over an IEEE 802.11g network once every hour to the server 620. The server 620 can periodically transmit data over a secured link to the remote server 630.

In some embodiments, the sensors 640-650 can transmit temperature, dynamic pressure, and speed measurements from each stage to an EHM unit 635. The EHM unit 635 can then transmit all of the sensors signals to the server 620. The EHM unit 635 could also include processing circuitry that processes the sensor signals and provides data (such as a PV diagram 435 or indicator 445, 450, 465, 470 and 475) to the server 620.

The server 620 can acquire additional data from the DCS controller 615. Additional data could, for example, include valve cover temperatures, loads, and so forth. Acquiring additional data helps the server 620 consolidate or enhance the fault indicators. In addition, information can be sent to any remote monitoring site or other location so as to prepare a health indicator report or perform other operations.

In some embodiments, the system 600 provides an integrated monitoring system for detecting faults in various components of a single-stage or multi-stage reciprocating compressor. Various failure modes can include pressure packing failure, pressure ring failure, and the like. The IMS 400 implemented in the system 600 (such as in an EHM unit 635 or a server 620) can take temperature measurements at various points, dynamic pressure measurements at various stages, and speed measurements. The IMS 400 can then use this data to identify potential faults in the reciprocating compressor.

In some embodiments, the system 600 provides an integrated monitoring system for detecting faults in a pump. For example, a pump monitoring system can be configured to normalize vibration data with respect to performance parameters such that the vibration data only depends on a defective condition. The vibration can then be expressed as a transfer function of the performance parameters so that a normal vibration at any operating point can be detected. Any vibration more than the normal vibration can be treated as a defective condition, and cases for operating defects like cavitations and recirculation can be aggregated so that a single indicator is obtained for these defects.

Figure 7:
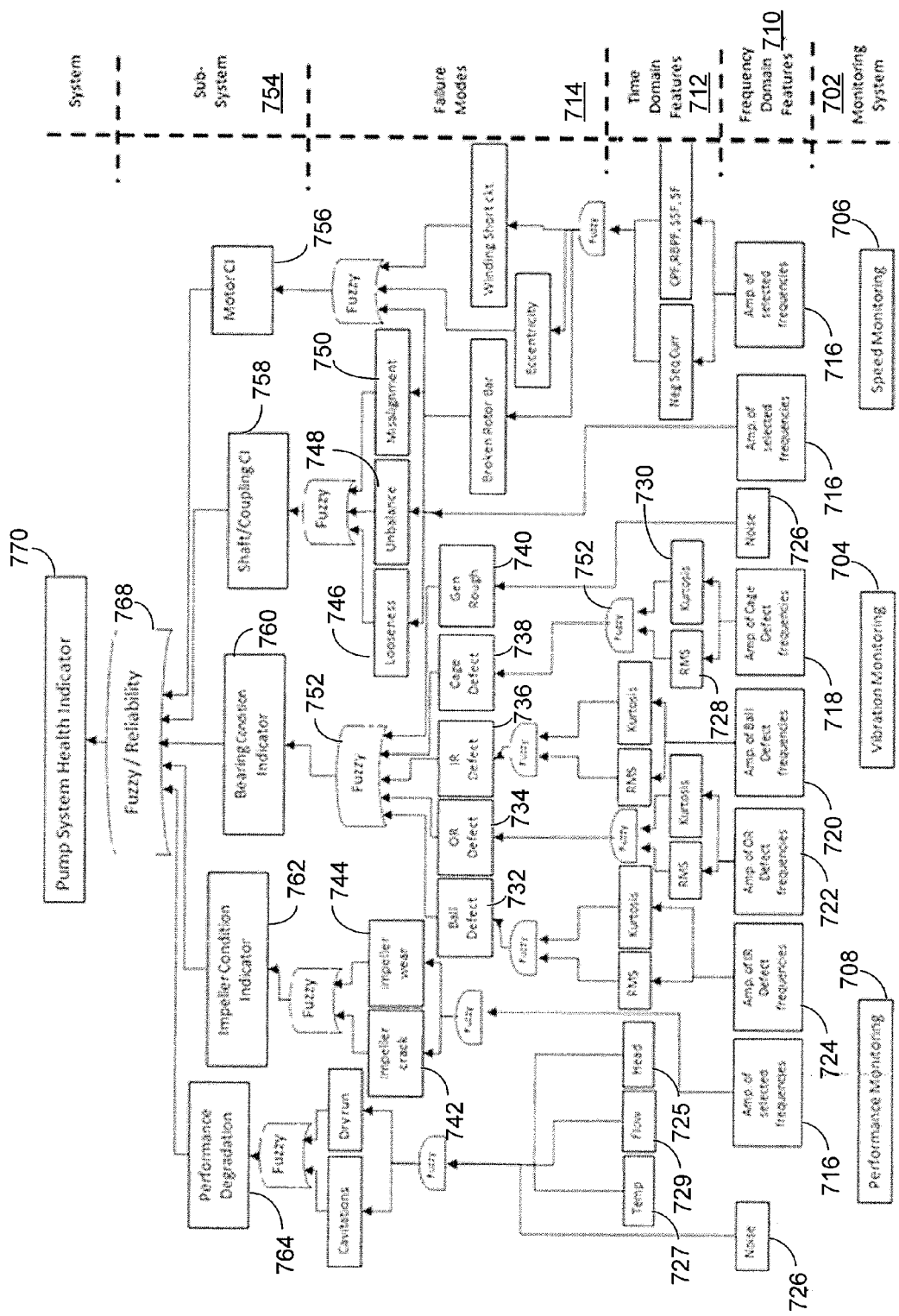
FIG. 7 illustrates an example pump monitoring system according to this disclosure.

FIG. 7 illustrates an example pump monitoring system 700 according to this disclosure. The pump monitoring system 700 can be included in the IMS 400 of FIG. 4, or it can be implemented separate from the IMS 400. The pump monitoring system 700 includes processing circuitry configured to use various monitoring schemes 702. The monitoring schemes 702 include vibration monitoring 704, speed monitoring 706, and performance monitoring 708 (such as discharge pressure, suction pressure, and suction temperature). However, other monitoring schemes can be used, such as motor current signature analysis, acoustics emission signal analysis, noise signature analysis, and the like.

Signals are further processed for frequency domain features 710 and time domain features 712 to obtain an array of amplitudes and frequencies for different component/failure modes 714. The amplitudes and frequencies can include amplitudes for selected frequencies 716, cage defect frequencies 718, ball defect frequencies 720, outer race (OR) defect frequencies 722, and inner race (IR) defect frequencies 724. Additional data includes head values 725, noise 726, temperatures 727, and flow rates 729.

The processing techniques can include filters and FFT analyses. For example, the pump monitoring system 700 can determine features such as root mean square (RMS) 728 and Kurtosis 730 values using the amplitudes/frequencies and additional data.

The processing circuitry can apply fuzzy rules 731 to the time domain features 710 and frequency domain features 712 to identify failure modes 714. Some component-specific failure modes can include IR defects 732, OR defects 734, ball defects 736, cage defects 738, general roughness 740, impeller cracks 742, impeller wear 744, looseness 746, unbalance 748, and misalignment 750. The processing circuitry applies fuzzy rules 752 to the failure modes 714 to obtain various health indicators for a pump. The indicators can include a motor condition indicator 756, a shaft/coupling condition indicator 758, a bearing condition indicator 760, an impeller condition indicator 762, and a performance degradation 764.

The processing circuitry integrates these features using fuzzy rules 768 to obtain an overall pump system health indicator 770. Note that while fuzzy rules are shown here, other logic could be used. For instance, integrators like Dempster-Shafer and Bayesian fusion techniques can be used. Similarly, the pump health indicator 770 can be determined using the component indicators in any other suitable manner.

Figure 8:
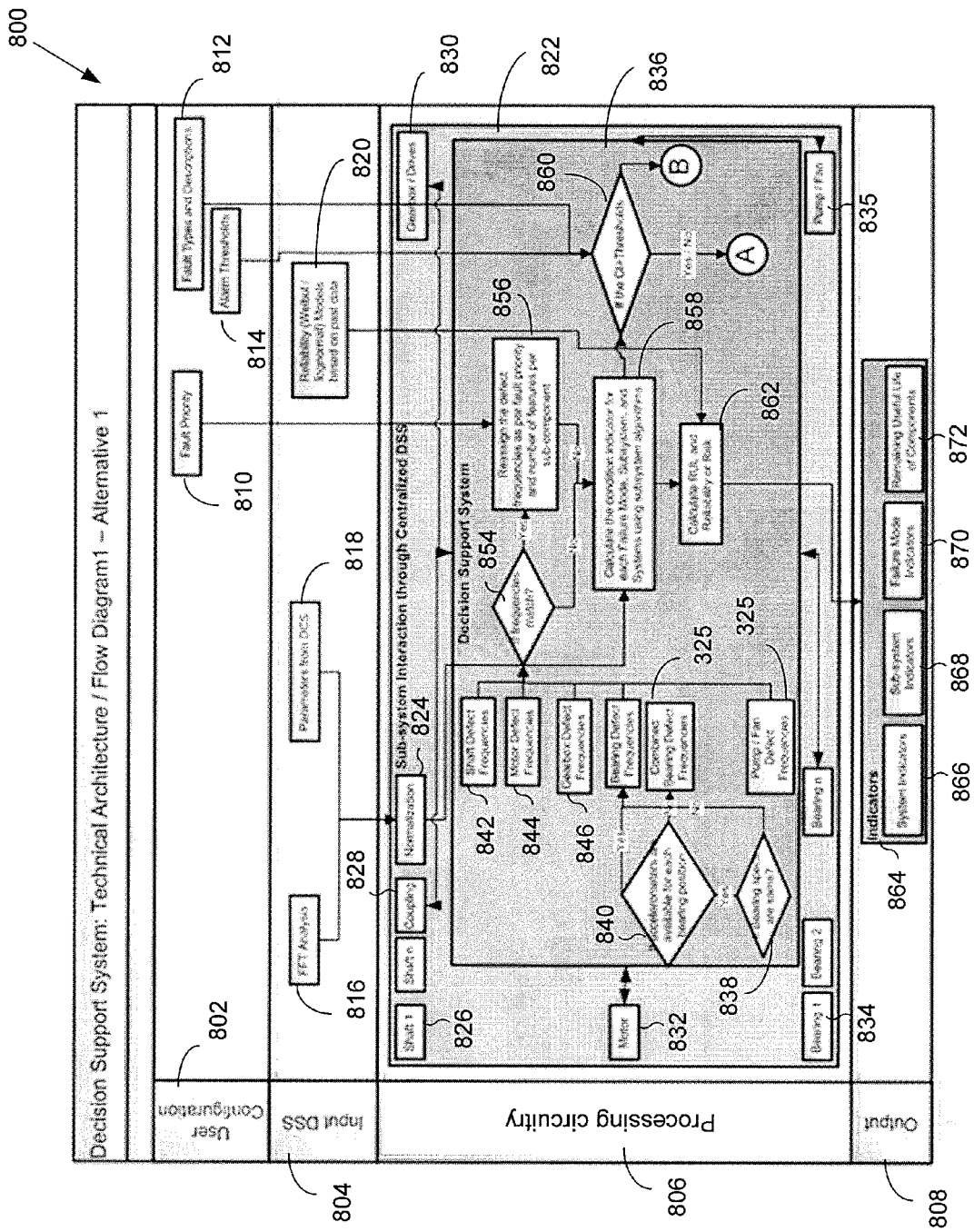
FIGS. 8 and 9 illustrate an example centralized decision support system for a pump monitoring system according to this disclosure.

FIG. 8 illustrates an example centralized decision support system 800 for a pump monitoring system according to this disclosure. The system 800 here includes a user configuration interface 802, an input interface 804, processing circuitry 806, and an output interface 808. Through the user configuration interface 802, the operator can input a fault priority 810, fault types and descriptions 812, and alarm thresholds 814. The input interface 804 is configured to receive information regarding an FFT analysis 816 and parameters 818 from the DCS controller 615. The input interface 804 also can receive reliability models 820, such as Weibull/lognormal models, based on past data. The processing circuitry 806 includes an interactive subsystem 822. The interactive subsystem 822 includes a normalization module 824 configured to perform normalization of vibration data with performance parameters. The performance parameters can be measured or tracked from DCS data. The parameters can include things like suction pressure, discharge pressure, and suction temperature. The interactive subsystem 822 receives shaft information 826, coupling information 828, gearbox/drive information 830, motor information 832, bearing information 834, and pump/fan information 835. This information describes various aspects of a pump being monitored.

The processing circuitry 806 includes decision support subsystem 836. The decision support subsystem 836 evaluates if bearing specifications are the same (block 838). If the bearing specifications are the same, the decision support subsystem 836 determines if an accelerometer is available for each bearing position (block 840). If the bearing specifications are not the same or if accelerometers are available at the bearing positions, the decision support subsystem 836 evaluates shaft defect frequencies 842, motor defect frequencies 844, gearbox defect frequencies 846, and bearing defect frequencies 848. If accelerometers are not available at all bearing positions, the decision support subsystem 836 evaluates the combined bearing defect frequencies 850. The decision support subsystem 836 uses the defect frequencies 842-850 to determine pump/fan defect frequencies 852.

The decision support subsystem 836 evaluates whether any of the defect frequencies 842-852 match in block 854. If any of the frequencies match, the decision support subsystem 836 uses the fault priority 810 to reassign the defect frequencies according to the fault priority and a number of features per sub-component 856. If the frequencies do not match in block 854, normalized vibration information from the normalization module 824 and reassigned defects (block 856) are applied to calculate the condition indicator for each failure mode, subsystem and systems using subsystem processes (block 858). Thereafter, the decision support subsystem 836 determines if any of the condition indicators is greater than any of the alarm thresholds 814 in block 860. The decision support subsystem 836 calculates reliability or risk in block 862. The processing circuitry outputs the results of the reliability calculations in block 862 and provides indicators 864, including system indicators 866, sub-system indicators 868, failure mode indicators 870, and remaining useful life of components 872.

There may be instances when there is a conflict among the components due to their similar configurations or matching/similar frequencies. In such a case, a confidence level can be calculated for identified faults. An example technique for doing this is described in U.S. patent application Ser. No. 12/797,472 filed on Jul. 10, 2010 and entitled "SYSTEM AND METHOD FOR CONFLICT RESOLUTION TO SUPPORT SIMULTANEOUS MONITORING OF MULTIPLE SUBSYSTEMS" (which is hereby incorporated by reference). In other instances, some reliability models of failure modes of the pump can be derived from historical data. These models can be input to the pump monitoring system. Based upon the current operating and vibration data, a failure mode severity, a risk of operating the pump, or a remaining useful life of the component can be predicted.

Figure 9:
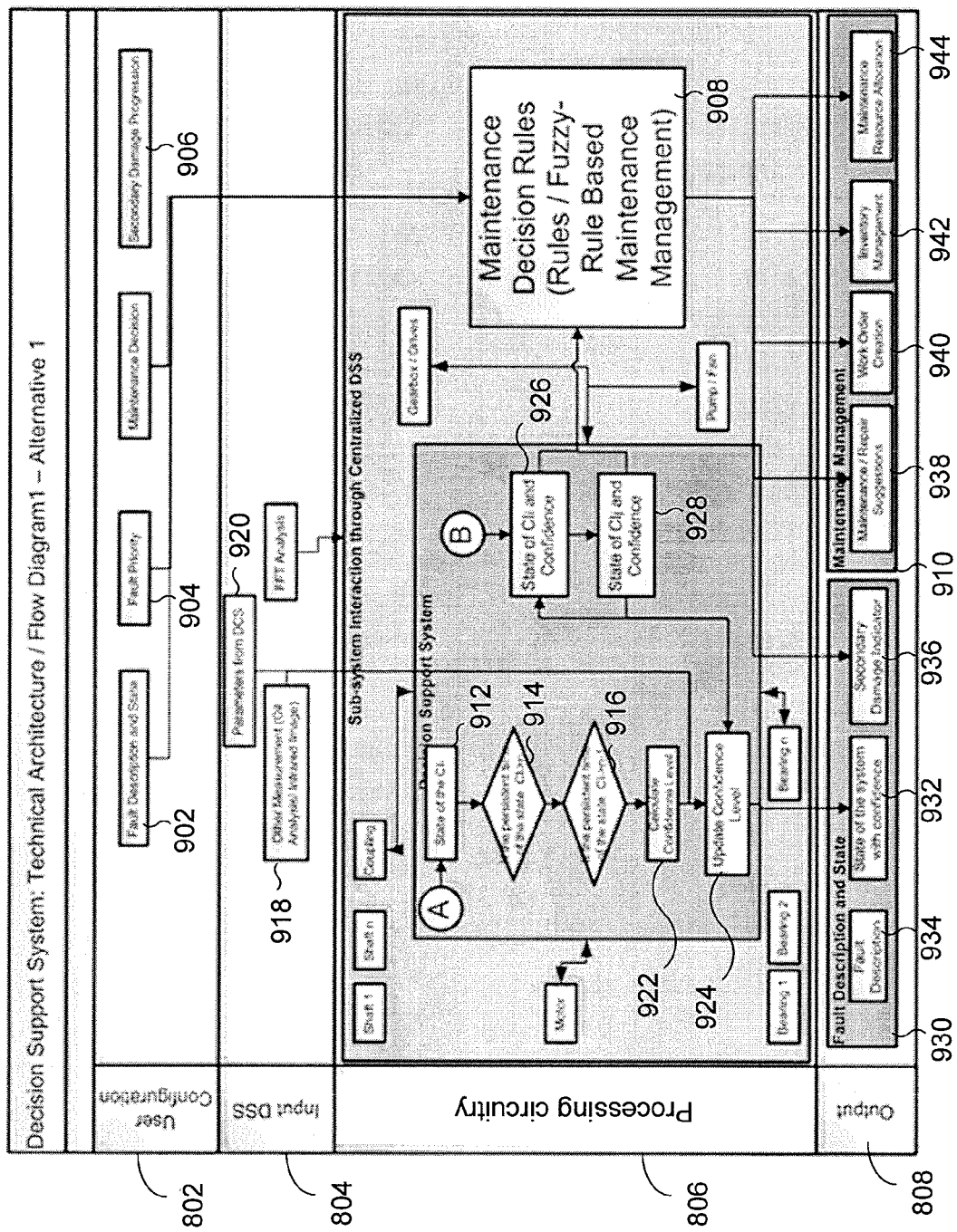

As shown in FIG. 9, a maintenance decision can be prioritized based on fault descriptions and states 902 (fault indicators and component indicators), a fault priority list 904 that can be input by the user, and the level of secondary damage progression 906. The processing circuitry 806 can use maintenance decision rules in block 908 so as to obtain a maintenance decision 910.

Additionally, if a condition indicator is greater than a threshold in block 860 of FIG. 8, the processing circuitry 806 determines the state of the condition indicator in block 912. The processing circuitry 806 determines if a persistent time of the condition indicator is greater than values "n" and n−1 in blocks 914 and 916, respectively. Using other measurements 918 or parameters 920 from the DCS controller 615, the processing circuitry 806 calculates (block 922) and updates (block 924) a confidence level. The processing circuitry 806 also determines the state of the condition indicator for a position ($CI_i$) (block 926) and orientation ($CI_j$) (block 928). The processing circuitry 806 then outputs the fault description and state 930, including a state of the system with a confidence level 932, a fault description 934, and a secondary damage indicator 936. The processing circuitry also outputs the maintenance management decision 910, which includes maintenance/repair suggestions 938, work order creation 940, inventory management 942, and maintenance resource allocation 944.

Figure 10:
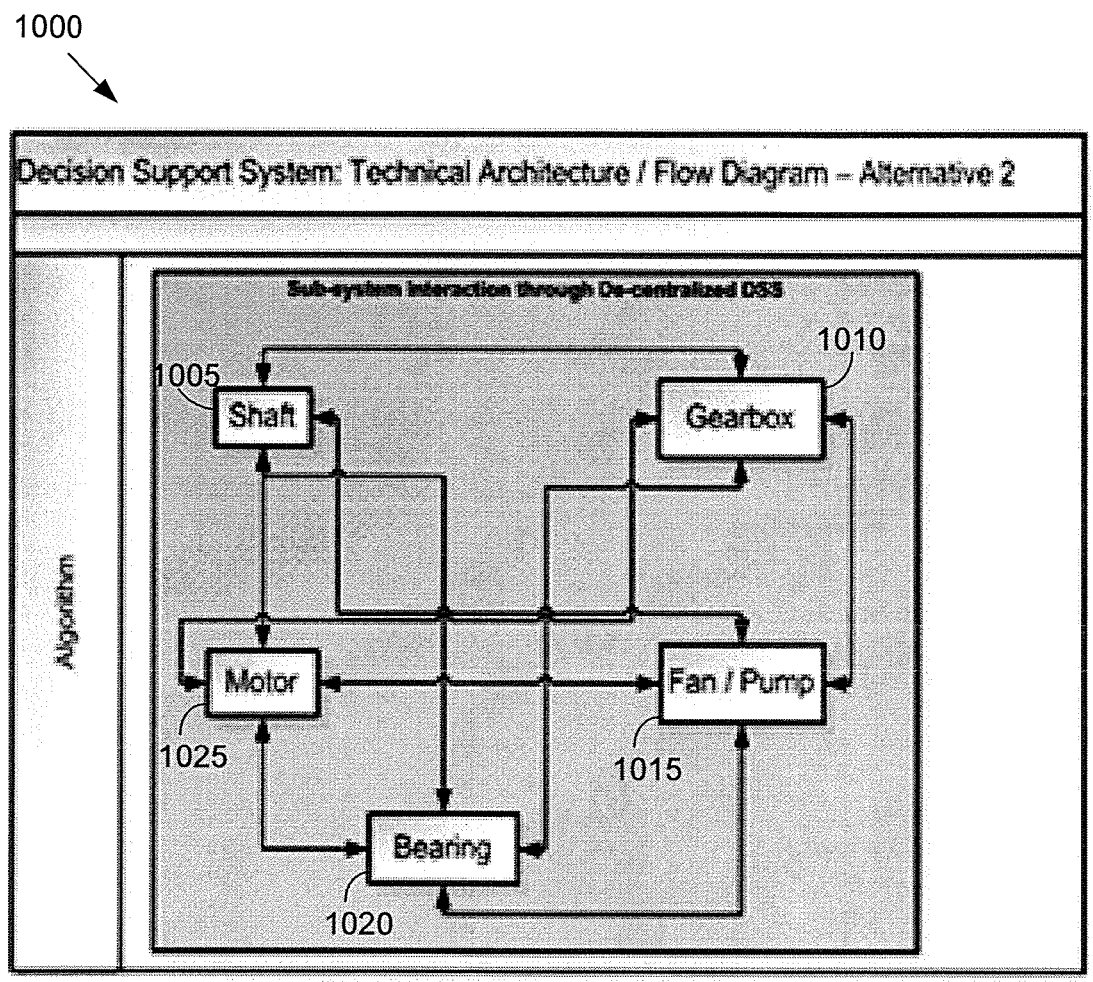
FIG. 10 illustrates an example decentralized decision support system for a pump monitoring system according to this disclosure.

FIG. 10 illustrates an example decentralized decision support system 1000 for a pump monitoring system according to this disclosure. In the de-centralized system 1000, each component can interact with other components. For example, processing circuitry 806 enables the shaft 1005 to communicate directly with the gearbox 1010, fan/pump 1015, bearing 1020 and motor 1025. Therefore, the output of the system (such as fault indicators, pump system indicators, secondary damage indicators, and various maintenance decisions) can be derived.

The various embodiments described above provide different monitoring systems where inputs can include a number of monitoring schemes (such as vibration, speed, and performance like flow, pressure, and temperature). The information is processed into features, failure mode indicators, component indicators and health indicators. Various other features, such as normalization of vibration data with respect to operating data, so that defects can be isolated from the effects of operating parameters. Moreover, reliability models like lognormal or Weibull models of any failure mode or component can be fed into the system. These models can be used by the monitoring system so that the severity of a failure mode can be determined.

Although the figures described above have illustrated various embodiments, any number of modifications could be made to these figures. For example, any suitable type of rotating machine system or reciprocating machine system could be monitored, and any suitable types of faults could be detected. Also, various functions shown as being performed by the IMS 400 or pump monitoring system 700 could be combined, further subdivided, or omitted and additional functions could be added according to particular needs. Further, while FIGS. 6 through 9 illustrate various series of steps, various steps in FIGS. 6 through 9 could overlap, occur in parallel, occur multiple times, or occur in a different order. In addition, each component in a device or system could be implemented using any suitable structure for performing the described function(s).

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an input interface configured to receive multiple input signals, each input signal associated with a respective stage of a rotating or reciprocating system;
   a processing unit configured to identify a fault in the rotating or reciprocating system using the input signals, wherein the processing unit is configured to identify the fault by:
   generating a first pressure-volume diagram associated with a first stage of the rotating or reciprocating system and a second pressure-volume diagram associated with a second stage of the rotating or reciprocating system from a fusion of the input signals; and
   comparing the first and second pressure-volume diagrams to determine whether a problem exists in at least one of the stages;
   an output interface configured to provide an indicator identifying the fault.

2. The apparatus of claim 1, wherein the input signals comprise at least one of:
   a signal associated with a temperature measurement;
   a signal associated with a pressure measurement;
   a signal associated with a speed measurement;
   a signal associated with a vibration measurement; and
   a signal associated with a performance measurement comprising at least one of: a discharge pressure, a suction pressure, and a suction temperature.

3. The apparatus of claim 1, wherein the input interface is configured to be coupled to at least one of:
   a dynamic pressure sensor configured to provide a valve pressure; and
   a temperature sensor configured to provide a valve cover temperature.

4. The apparatus of claim 3, wherein the processing unit is configured to:
   fuse a first input signal from the dynamic pressure sensor and a second input signal from the temperature sensor;
   detect a problem at the valve; and
   based on the detected problem, determine whether the valve should be replaced.

5. The apparatus of claim 1, wherein the processing unit is configured to compare a pressure-volume diagram associated with a first stage of the rotating or reciprocating system and a pressure-volume diagram associated with a second stage of the rotating or reciprocating system to determine whether a problem exists in the first stage.

6. The apparatus of claim 1, wherein the processing unit is configured to determine if the fault is at least one of:
   a process-related issue;
   a valve failure;
   a pressure packing failure;
   a piston ring failure; and
   a defect in a pump system.

7. The apparatus of claim 1, wherein the indicator identifying the fault comprises at least one of:
   one or more of the pressure-volume diagrams;
   a suction valve condition indicator;
   a discharge valve condition indicator;

a pressure rings indicator;
a pressure packing indicator; and
a process issues indicator.

8. An apparatus comprising:
an input interface configured to receive multiple input signals, each input signal associated with a respective stage of reciprocating system;
a processing unit configured to identify a fault in the rotating or reciprocating system using the input signals, wherein the processing unit is configured to identify the fault by normalizing the input signals and using the normalized input signals to identify a defect and calculate a confidence level of the defect; and
an output interface configured to provide an indicator identifying the fault;
wherein the processing unit is configured to normalize the input signals using at least one of: a root mean square (RMS) value and a Kurtosis value.

9. An apparatus comprising:
an input interface configured to receive multiple input signals, each input signal associated with a respective stage of a rotating or reciprocating system;
a processing unit configured to identify a fault in the rotating or reciprocating system using the input signals, wherein the processing unit is configured to identify the fault by generating a pressure-volume diagram from a fusion of the input signals and comparing the pressure-volume diagram to another diagram to determine changes in the diagrams; and
an output interface configured to provide an indicator identifying the fault;
wherein the processing unit is configured to generate the fusion by performing at least one of:
a fuzzy fusion;
a Dempster-Shafer fusion; and
a Bayesian fusion.

10. A system comprising:
multiple sensors configured to measure one or more characteristics of a rotating or reciprocating system; and
a monitoring system configured to monitor a health of the rotating or reciprocating system, the monitoring system comprising:
an input interface configured to receive multiple input signals from the sensors;
a processing unit configured to identify a fault in the rotating or reciprocating system using the input signals, wherein the processing unit is configured to identify the fault by:
generating a first pressure-volume diagram associated with a first stage of the rotating or reciprocating system and a second pressure-volume diagram associated with a second stage of the rotating or reciprocating system from a fusion of the input signals; and
comparing the first and second pressure-volume diagrams to determine whether a problem exists in at least one of the stages; and
an output interface configured to provide an indicator identifying the fault.

11. The system of claim 10, wherein the input signals comprise at least one of:
a signal associated with a temperature measurement;
a signal associated with a pressure measurement;
a signal associated with a speed measurement;
a signal associated with a vibration measurement; and
a signal associated with a performance measurement comprising at least one of: a discharge pressure, a suction pressure, and a suction temperature.

12. The system of claim 10, wherein the sensors comprise at least one of:
a dynamic pressure sensor configured to provide a valve pressure; and
a temperature sensor configured to provide a valve cover temperature.

13. The system of claim 12, wherein the processing unit is configured to:
fuse a first input signal from the dynamic pressure sensor and a second input signal from the temperature sensor;
detect a problem at the valve; and
based on the detected problem, determine whether the valve should be replaced.

14. The system of claim 10, wherein the processing unit is configured to compare a pressure-volume diagram associated with a first stage of the rotating or reciprocating system and a pressure-volume diagram associated with a second stage of the rotating or reciprocating system to determine whether a problem exists in the first stage.

15. The system of claim 10, wherein the processing unit is configured to determine if the fault is at least one of:
a process-related issue;
a valve failure;
a pressure packing failure;
a piston ring failure; and
a defect in a pump system.

16. The system of claim 10, wherein the indicator identifying the fault comprises at least one of:
one or more of the pressure-volume diagrams;
a suction valve condition indicator;
a discharge valve condition indicator;
a pressure rings indicator;
a pressure packing indicator; and
a process issues indicator.

17. A system comprising:
multiple sensors configured to measure one or more characteristics of a rotating or reciprocating system; and
a monitoring system configured to monitor a health of the rotating or reciprocating system, the monitoring system comprising:
an input interface configured to receive multiple input signals from the sensors;
a processing sing unit configured to identify a fault in the rotating or reciprocating system using the input signals, wherein the processing unit is configured to identify the fault by generating a pressure-volume diagram from a fusion of the input signals and comparing the pressure-volume diagram to another diagram to determine changes in the diagrams; and
an output interface configured to provide an indicator identifying the fault;
wherein the processing unit is configured to generate the fusion by performing at least one of:
a fuzzy fusion;
a Dempster-Shafer fusion; and
a Bayesian fusion.

18. A method comprising:
receiving multiple input signals, each input signal associated with a respective stage of a rotating or reciprocating system;
identifying a fault in the rotating or reciprocating system using the input signals, wherein the fault is identified by:
generating first a pressure-volume diagram associated with a first stage of the rotating or reciprocating system and a second pressure-volume diagram associated with a second stage of the rotating or reciprocating system from a fusion of the input signals; and comparing the first and second pressure-volume diagrams to determine whether a problem exists in at least one of the stages; and providing an indicator identifying the fault.

19. The method of claim 18, wherein:

receiving the input signals comprises receiving a valve pressure from a dynamic pressure sensor and a valve cover temperature from a temperature sensor; and identifying the fault comprises:

fusing a first input signal from the dynamic pressure sensor and a second input signal from the temperature sensor;

detecting a problem at the valve; and based on the detected problem, determining whether the valve should be replaced.

20. A non-transitory computer readable medium embodying a computer program, the computer program comprising computer readable program code for:

receiving multiple input signals, each input signal associated with a respective stage of a rotating or reciprocating system;

identifying a fault in the rotating or reciprocating system using the input signals, wherein the fault is identified by:

generating first a pressure-volume diagram associated with a first stage of the rotating or reciprocating system and a second pressure-volume diagram associated with a second stage of the rotating or reciprocating system from a fusion of the input signals; and comparing the first and second pressure-volume diagrams to determine whether a problem exists in at least one of the stages; and providing an indicator identifying the fault.

\* \* \* \* \*